US012019856B2

(12) United States Patent
Lee

(10) Patent No.: US 12,019,856 B2
(45) Date of Patent: *Jun. 25, 2024

(54) PORTABLE TERMINAL HAVING TOUCH SCREEN AND METHOD FOR PROCESSING IMAGE THEREIN

(71) Applicant: Samsung Electronics Co., Ltd., Suwon-si (KR)

(72) Inventor: Seok Gon Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

This patent is subject to a terminal disclaimer.

(21) Appl. No.: 17/733,413

(22) Filed: Apr. 29, 2022

(65) Prior Publication Data
US 2022/0261138 A1 Aug. 18, 2022

Related U.S. Application Data

(63) Continuation of application No. 16/797,439, filed on Feb. 21, 2020, now Pat. No. 11,334,231, which is a (Continued)

(30) Foreign Application Priority Data

Nov. 5, 2007 (KR) .......................... 10-2007-0112068

(51) Int. Cl.
*G06F 3/04845* (2022.01)
*G06F 3/0488* (2022.01)
(Continued)

(52) U.S. Cl.
CPC ........ *G06F 3/04845* (2013.01); *G06F 3/0488* (2013.01); *G06F 3/04883* (2013.01); *H04N 23/635* (2023.01)

(58) Field of Classification Search
CPC .............. G06F 3/04845; G06F 3/0488; G06F 3/04883; G06F 3/041; G06F 3/14; H04N 23/635
See application file for complete search history.

(56) References Cited

U.S. PATENT DOCUMENTS 5,509,114 A 4/1996 Moran et al.
5,630,037 A 5/1997 Schindler
(Continued)

FOREIGN PATENT DOCUMENTS

JP 2002251621 A 9/2002
KR 10-1999-0031934 A 5/1999
(Continued)

*Primary Examiner* — Albert H Cutler
(74) *Attorney, Agent, or Firm* — Jefferson IP Law, LLP

(57) ABSTRACT

A portable terminal having a touch screen and a method for processing an image therein are provided. The portable terminal includes a camera unit for photographing an image, a touch screen for displaying the photographed image, a controller for generating, if a substantially continuous drawing motion is detected on the touch screen, a partial area in the displayed image according to the drawing motion, and a memory unit for storing the partial area of the displayed image. Accordingly, the portable terminal may more easily perform image photographing and editing, thereby increasing user convenience.

21 Claims, 5 Drawing Sheets

Related U.S. Application Data continuation of application No. 14/635,626, filed on Mar. 2, 2015, now Pat. No. 10,719,207, which is a continuation of application No. 12/184,427, filed on Aug. 1, 2008, now Pat. No. 8,970,760.

(51) Int. Cl.
  *G06F 3/04883* (2022.01)
  *H04N 23/63* (2023.01)

(56) References Cited

U.S. PATENT DOCUMENTS

| | | |
|---|---|---|
| 6,054,990 A | 4/2000 | Tran |
| 6,987,535 B1 | 1/2006 | Matsugu et al. |
| 7,034,881 B1 | 4/2006 | Hyodo et al. |
| 7,154,544 B2 | 12/2006 | Kowno et al. |
| 7,268,772 B2 | 9/2007 | Kawai et al. |
| 7,362,367 B2 | 4/2008 | Soga |
| 7,382,919 B2 | 6/2008 | Eschbach et al. |
| 7,440,013 B2 | 10/2008 | Funakura |
| 7,453,506 B2 | 11/2008 | Li |
| 7,471,890 B2 | 12/2008 | Lee et al. |
| 7,742,095 B2 | 6/2010 | Maeda |
| 7,755,674 B2 | 7/2010 | Kaminaga |
| 7,880,792 B2 | 2/2011 | Yanagi |
| 8,497,928 B2 | 7/2013 | Crowley et al. |
| 8,643,605 B2 | 2/2014 | Yu et al. |
| 9,395,905 B2 | 7/2016 | Wherry |
| 10,719,207 B2 | 7/2020 | Lee |
| 11,334,231 B2 * | 5/2022 | Lee .................. G06F 3/04883 |
| 2002/0113796 A1 | 8/2002 | Oshiyama et al. |
| 2004/0012702 A1 | 1/2004 | Ishige |
| 2005/0156902 A1 | 7/2005 | McPherson et al. |
| 2006/0044396 A1 | 3/2006 | Miyashita et al. |
| 2007/0253600 A1 | 11/2007 | Furukawa et al. |
| 2008/0106615 A1 | 5/2008 | Ahonen et al. |
| 2008/0239133 A1 | 10/2008 | Cazier et al. |

FOREIGN PATENT DOCUMENTS

| | | |
|---|---|---|
| KR | 10-2005-0018084 A | 2/2005 |
| KR | 10-2005-0062633 A | 6/2005 |
| WO | 2006-013639 A1 | 2/2006 |

* cited by examiner

PORTABLE TERMINAL HAVING TOUCH SCREEN AND METHOD FOR PROCESSING IMAGE THEREIN

CROSS-REFERENCE TO RELATED APPLICATION(S)

This application is a continuation application of a prior application Ser. No. 16/797,439, filed on Feb. 21, 2020, which application is a continuation application of a prior application Ser. No. 14/635,626, filed on Mar. 2, 2015, which has issued as U.S. Pat. No. 10,719,207, on Jul. 21, 2020, which is a continuation application of a prior application Ser. No. 12/184,427, filed on Aug. 1, 2008, which has issued as U.S. Pat. No. 8,970,760 on Mar. 3, 2015 and was based on and claimed the benefit under 35 U.S.C. § 119(a) of a Korean patent application filed on Nov. 5, 2007 in the Korean Intellectual Property Office and assigned Serial number 10-2007-0112068, the entire disclosures of each of which are hereby incorporated by reference.

TECHNICAL FIELD

The present invention relates to a portable terminal and a method for processing an image therein. More particularly, the present invention relates to a portable terminal having a touch screen and a method for processing an image therein.

BACKGROUND

Portable terminals have evolved to perform a variety of functions, such as multimedia functions. Multimedia functions that may be included in a portable terminal include a camera function, a Digital Multimedia Broadcasting (DMB) function and a Bluetooth communication function.

However, in the case of image photographing using a camera function of a portable terminal, an image stored in the portable terminal is limited to a certain form and size, and thus, the stored image may need to be edited to change the form or size of the stored image. Therefore, the portable terminal should have separate functions of storing the image and editing the stored image.

SUMMARY

An aspect of the present invention is to address the above-mentioned problems and/or disadvantages and to provide at least the advantages described below. Accordingly, an aspect of the present invention is to provide a portable terminal having a touch screen and a method for processing an image therein.

According to an aspect of the present invention, a method for processing an image in a portable terminal having a touch screen is provided. The method includes displaying an image on the touch screen, generating, if a substantially continuous drawing motion is detected on the touch screen, a partial area in the displayed image according to the drawing motion, and storing the partial area of the displayed image.

According to another aspect of the present invention, a method for processing an image in a portable terminal having a touch screen is provided. The method includes displaying an image to be edited using the touch screen, generating, if a substantially continuous drawing motion is detected on the touch screen, a partial area of the image according to the drawing motion, storing the partial area, and displaying an overlaid image in which the stored partial area is overlaid onto another image on the touch screen.

According to yet another aspect of the present invention, a portable terminal is provided. The portable terminal includes a camera unit for photographing an image, a touch screen for displaying the photographed image, a controller for generating, if a substantially continuous drawing motion is detected on the touch screen, a partial area in the displayed image, and a memory unit for storing the partial area of the displayed image.

According to still another aspect of the present invention, a portable terminal is provided. The portable terminal includes a touch screen for displaying an image to be edited, and a controller for controlling to generate, if a substantially continuous drawing motion is detected on the touch screen when displaying the image, a partial area of the image according to the drawing motion, to store the partial image and to display an overlaid image in which the stored partial area is overlaid onto another image on the touch screen.

According to a further aspect of the present invention, the portable terminal can selectively store an area having a desired format and size when an image is photographed. Further, the portable terminal can selectively store an area having a desired format and size from a selected image when the image is edited. In addition, when an image is photographed or edited, the portable terminal can store an overlaid image in which at least two images are overlaid. Accordingly, the portable terminal can easily perform image photographing and editing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, detailed descriptions of well-known functions and constructions are omitted for clarity and conciseness.

In the following description, a "preview image" refers to an image captured in a portable terminal prior to photographing. The captured image may then be photographed in the portable terminal but is not stored therein. An "edit image" refers to an image that is to be edited in the portable terminal. The edit image may be a preview image or an image previously stored in the portable terminal. An "overall area" refers to an area having the same format and size as the preview image. A "partial area" refers to a preset area within the preview image or the edit image in the portable terminal.

Further, a "touch" refers to a series of actions that may be executed with a user's finger or a stylus by touching a touch screen. "Drawing" refers to a movement of a touch point of the user's finger or the stylus on the touch screen representing an action of drawing a line along a path.

Figure 1:
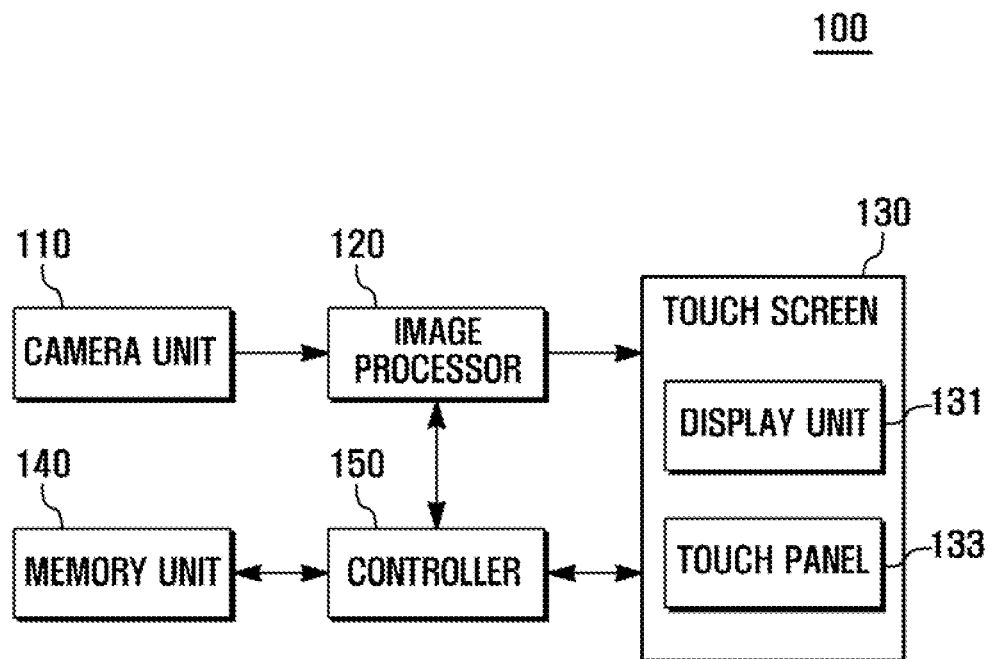
FIG. 1 is a block diagram illustrating a schematic configuration of a portable terminal according to an exemplary embodiment of the present invention.

FIG. 1 is a block diagram illustrating a schematic configuration of a portable terminal according to an exemplary embodiment of the present invention. The portable terminal may be provided as, for example, a mobile phone or the like.

Referring to FIG. 1, the portable terminal 100 includes a camera unit 110, an image processor 120, a touch screen 130, a memory unit 140 and a controller 150.

The camera unit 110 is used for photographing image data and includes a camera sensor that converts an input optical signal into an analog image signal and a signal processor that converts the analog image signal from the camera sensor into digital data. The camera sensor may be embodied as a Charge-Coupled Device (CCD) sensor or the like. The signal processor may be embodied as a Digital Signal Processor (DSP) or the like. The camera sensor and the signal processor may be provided integrally or separately.

The image processor 120 generates screen data for displaying an image signal output from the camera unit 110. The image processor 120 processes the image signal output from the camera unit 110 in a frame unit and outputs frame image data to be suitable for the characteristics and size of a display unit 131 of the touch screen 130. Further, the image processor 120 includes an image coder/decoder (codec), and compresses the frame image data displayed on the display unit 131 in a preset method or restores the compressed frame image data into the original frame image data. The image codec may be a Joint Photographic Experts Group (JPEG) codec, an Moving Picture Experts Group-4 (MPEG4) codec, or a Wavelet codec.

The touch screen 130 includes the display unit 131 and a touch panel 133. The display unit 131 displays an image signal output from the image processor 120 on a screen and displays user data output from the controller 150. The display unit 131 may be embodied as an LCD or the like. When the display unit 131 is embodied as an LCD it may include an LCD controller, a memory for storing display data, and an LCD display element. The touch panel 133 is installed in the display unit 131 and includes a touch sensor and a signal converting unit. When a touch occurs, the touch sensor detects physical characteristics thereof, such as at least one of resistance, electrostatic capacity and the like, to detect the touch. The signal converting unit converts a change in the physical characteristics according to the touch into a touch signal.

The memory unit 140 includes a program memory and a data memory. The program memory stores an operating program of the portable terminal 100 and a program for processing an image using the touch screen 130 according to an exemplary embodiment of the present embodiment.

The controller 150 controls overall operations of the portable terminal 100. Further, the controller 150 includes a data processor including a transmitter for encoding and modulating a signal to be transmitted and a receiver for demodulating and decoding a received signal. The data processor may be provided with a modem and a codec. Also, the controller 150 receives a touch signal from the signal converting unit of the touch panel 133 to detect a touch on the touch screen 130.

When an image is photographed by the camera unit 110, the controller 150 processes the photographed image and controls to display the photographed image on the touch screen 130. If a drawing motion is detected on the touch screen 130 while displaying the photographed image, the controller 150 generates a partial area in the displayed image. The controller 150 then controls to store the image of the partial area, and to store a position of the partial area with respect to the touch screen 130.

If an image is to be edited, the controller 150 processes the image and controls to display the image on the touch screen 130. If a drawing motion is detected on the touch screen 130, the controller 150 generates a partial area in the image, and controls to store a position of the partial area with respect to the touch screen 130. Further, the controller 150 controls to generate an overlaid image by overlaying the partial area onto another image, and displays the overlaid image on the touch screen 130. The image onto which the partial area is overlaid may be an image to be edited or the like. The controller 150 then controls to store the overlaid image according to a storage request from the user.

Figure 2:
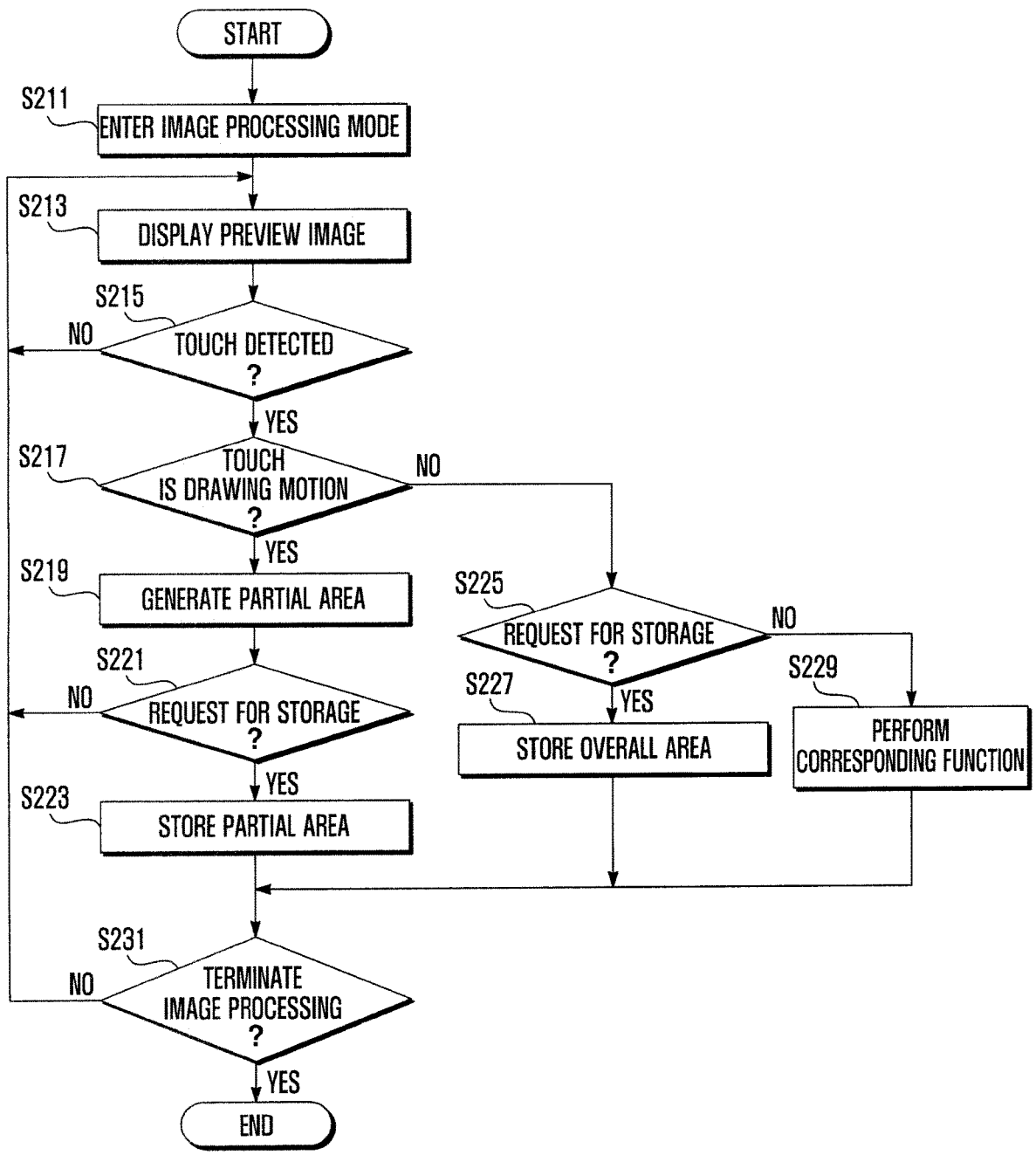
FIG. 2 is a flowchart illustrating a method for processing an image according to an exemplary embodiment of the present invention.
Figure 4A:
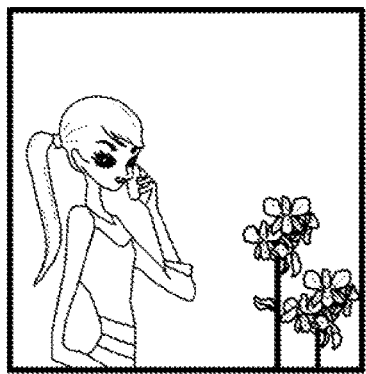
FIGS. 4A to 4H illustrate examples of a screen displayed in performing the image processing methods of FIGS. 2 and 3, according to exemplary embodiments of the present invention.
Figure 4B:
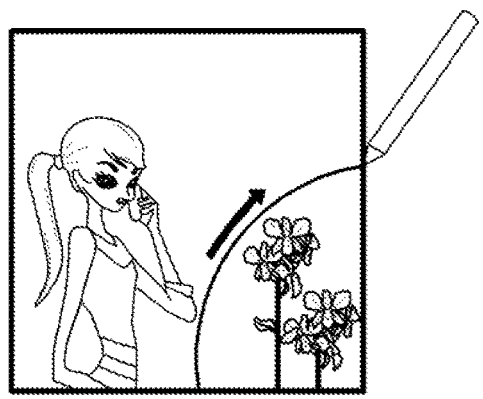
Figure 4C:
Figure 4D:
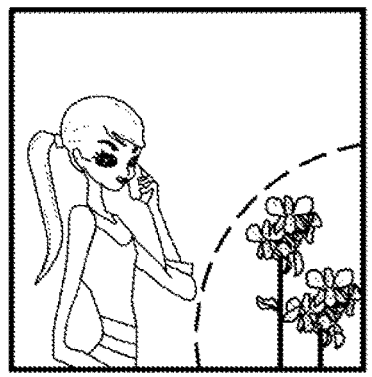

FIG. 2 is a flowchart illustrating a method for processing an image according to an exemplary embodiment of the present invention. FIGS. 4A to 4C illustrate examples of screens displayed when performing the image processing method of FIG. 2. Here, FIG. 4A illustrates a screen on which a preview image is displayed. FIG. 4B illustrates a screen displayed when a partial area is generated. FIGS. 4C and 4D illustrate a screen displayed when an image is stored.

Referring to FIG. 2, the controller 150 enters an image processing mode in step S211, and displays a preview image through the display unit 131 in step S213, as shown in FIG. 4A. That is, the controller 150 controls the camera unit 110 to capture an image and displays the captured image as the preview image. If the controller 150 detects a touch through the touch panel 133 in step S215, the controller 150 determines whether the touch is a drawing motion in step S217. That is, the controller 150 determines whether the touch generated on the touch panel 133 is an action of drawing a line along a path.

If the controller 150 determines that the touch is a drawing motion, the controller 150 generates a partial area using the path of the drawing in step S219, as shown in FIG. 4B. For example, if the drawing path is a fully enclosed curve, the controller 150 may generate the partial area from an inner area of the enclosed curve. Alternatively, if the drawing path contacts at least two edges of the preview image displayed on the touch screen 130, thereby bisecting the image, the controller 150 may generate the partial area from an area formed by the drawing path and the edges of the preview image contacting the drawing path. The partial area may be either of the two sections of the preview image. The partial area may then be selected by the user, such as by a touch, or may automatically be selected. Examples of an automatic selection of the partial area from the two sections include selection of the smaller of the two sections, selection of a section comprising a detected face, and the like.

If the controller 150 determines that a storage request is generated by the user in step S221, as shown in FIG. 4C, the controller 150 stores the partial area of the preview image in step S223, as shown in FIG. 4D. For example, if a touch is detected in the partial area, the controller 150 may recognize the touch as a request for storage. The controller 150 then stores the partial area of the preview image displayed on the touch screen 130 in the memory unit 140. The controller 150 also detects a position of the partial area with respect to the touch screen 130 and stores the position corresponding to the partial area.

If the controller 150 determines that the touch is not a drawing motion in step S217, the controller 150 determines whether the touch is a request for storage in step S225. If the touch is a request for storage, the controller 150 stores the overall area of the preview image in step S227. For example, if a touch is detected in the entire area of the preview image, the controller 150 may recognize the touch as a request for storage. The controller 150 then stores the overall area of the preview image displayed on the touch screen 130 in the memory unit 140.

If the touch is not a request for storage at step S225, the controller 150 performs a corresponding function in step S229. For example, according to an input by the user, the controller 150 may edit a stored image by changing the format and size thereof. Alternatively, the controller 150 may change a position of the stored image on the touch screen 130 corresponding to the partial area.

Finally, the controller 150 determines whether image processing is to be terminated in step S231. If the controller 150 determines that image processing is not to be terminated, the process returns to step S213 and the controller 150 displays a preview image. If the controller 150 determines that image processing is to be terminated in step S231, the controller 150 terminates image processing.

Figure 3:
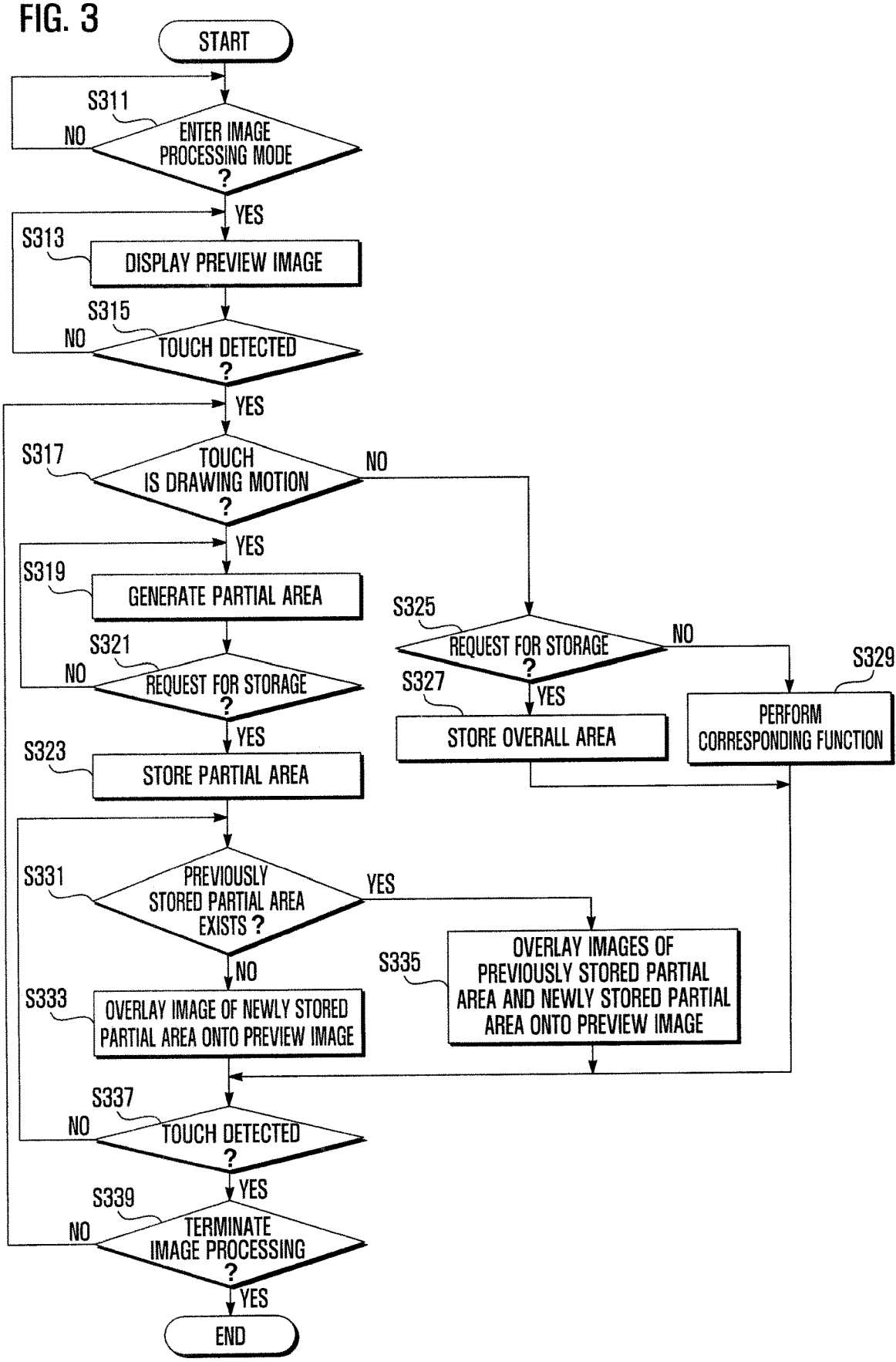
FIG. 3 is a flowchart illustrating another method for processing an image according to an exemplary embodiment of the present invention.
Figure 4E:
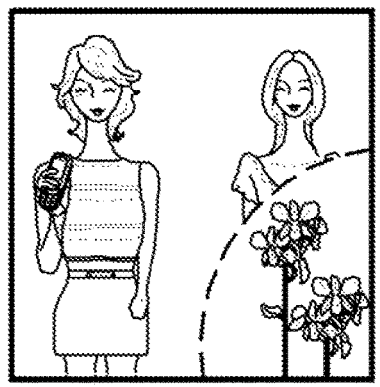
Figure 4F:
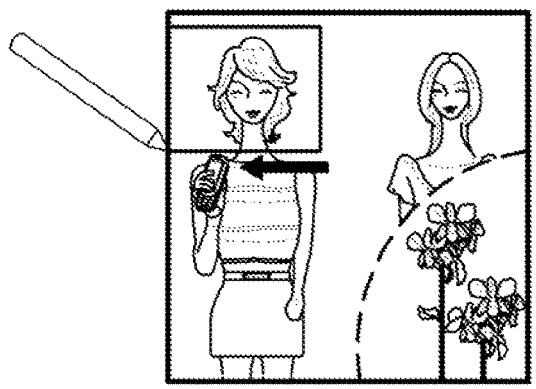
Figure 4G:
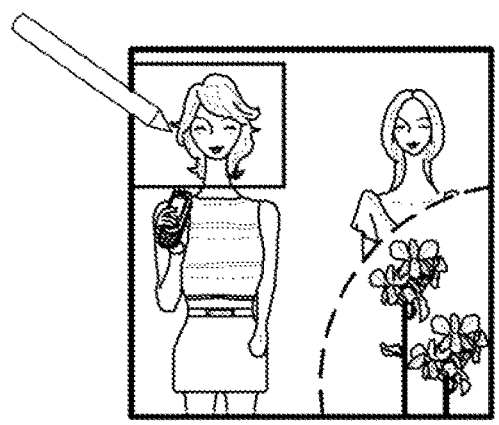
Figure 4H:
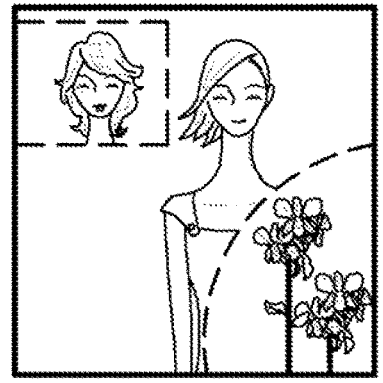

FIG. 3 is a flowchart illustrating another method for processing an image according to another exemplary embodiment of the present invention. FIGS. 4A to 4H illustrate examples of screens displayed when performing the image processing method of FIG. 3. Here, FIG. 4A illustrates a screen on which a preview image is displayed. FIGS. 4B and 4F illustrate screens displayed when a partial area is generated. FIGS. 4C, 4D and 4G illustrate screens displayed when an image is stored. FIGS. 4E and 4H illustrate screens on which an overlaid image is displayed.

Referring to FIG. 3, steps S311 to S329 in the image processing method of the present exemplary embodiment are similar to steps S211 to S229, respectively, of the image processing method of FIG. 2. Accordingly, a detailed description thereof will be omitted for conciseness.

Next, according to the image processing of the present exemplary embodiment, after the controller 150 stores the partial area of the preview image in step S323, the controller 150 determines whether a previously stored partial area exists in the memory unit 140 in step S331.

If a previously stored partial area does not exist, the controller 150 generates an overlaid image in which the newly stored partial area is overlaid onto the currently captured preview image in step S333, as shown in FIG. 4E. That is, the controller 150 displays the preview image and displays the partial area stored in step S323 overlaid onto the preview image. Further, the controller 150 may display another preview image captured by the portable terminal and display the partial area stored in step S323 overlaid onto the preview image, as shown in FIG. 4E. At this time, if a position of the corresponding partial area on the touch screen 130 is stored, the controller 150 displays the stored partial area at the corresponding stored position.

If the controller 150 detects a touch in step S337, the controller determines if the touch is a request to terminate image processing in step S339. If no touch is detected in step S337, the process returns to step S331. If the touch is determined not to be a request to terminate image processing in step S339, the process returns to step S317, and the controller 150 determines whether the touch is a drawing motion in step S317. That is, the controller 150 determines whether the touch generated on the touch panel 133 is an action of drawing a line along a path.

If the controller 150 determines that a previously stored partial area exists in the memory unit 140 in step S331, the controller 150 creates an overlaid image in which the previously stored partial area and the newly stored partial area are overlaid on the preview image, and displays the new overlaid image on the touch screen 130 in step S335, as shown in FIG. 4H. That is, the controller 150 displays the preview image and displays the stored partial areas overlaid on the preview image. Here, if the respective positions of the partial areas are stored with the corresponding partial area image in the memory unit 140, the controller 150 may display the stored partial areas at their corresponding positions with respect to the touch screen 130.

Next, the controller 150 determines whether a touch is generated through the touch panel 133 in step S337. If a touch is generated, the controller 150 determines whether the touch is a request to terminate image processing in step S339.

If the controller 150 determines that the touch is a drawing motion in step S317, the controller 150 generates a partial area using the drawing path in step S319, as shown in FIG. 4F. For example, if the drawing path is a fully enclosed curve, the controller 150 may generate the partial area from an inner area of the enclosed curve. Alternatively, if the drawing path contacts at least two edges of the overlaid image displayed as the preview image on the touch screen 130, thereby bisecting the image, the controller 150 may generate the partial area from an area formed by the drawing path and the edges of the preview image contacting the drawing path. The partial area may include at least some of the previously stored partial area. The partial area may be either of the two sections of the preview image. The partial area may then be selected by the user, such as by a touch, or may automatically be selected. Examples of an automatic selection of the partial area from the two sections include selection of the smaller of the two sections, selection of a section comprising a detected face, and the like.

Next, if the controller 150 determines that a storage request is generated by the user in step S321, as shown in FIG. 4G, the controller 150 stores the partial area of the displayed overlaid image in step S323. For example, if a touch is detected in the partial area, the controller 150 may recognize the touch as a request for storage. The controller 150 then stores the partial area of the displayed overlaid image in the memory unit 140. The controller 150 also detects a position of the partial area with respect to the touch screen 130 and stores the position corresponding to the partial area.

If the controller 150 determines that the touch is not a drawing motion in step S317, the controller 150 determines whether the touch is a request for storage in step S325. If the touch is a request for storage, the controller 150 stores the overall area of the displayed overlaid image in step S327. For example, if a touch is detected in the overall area of the overlaid image, the controller 150 may recognize the touch as a request for storage. The controller 150 then stores the overall area of the overlaid image displayed on the touch screen 130 in the memory unit 140.

Thereafter, the controller 150 determines whether a touch is generated through the touch panel 133 in step S337, as described above.

Finally, if a touch is generated through the touch panel 133 in step S337, and the controller 150 determines that the touch is a request to terminate image processing in step S339, the controller 150 terminates image processing. If the touch is not a request to terminate image processing in step S339, as described above, the controller 150 may repeatedly perform steps S317 to S339 until a request to terminate image processing is generated.

The above-described embodiments illustrate examples in which a portable terminal processes an image captured by a camera unit, however the invention is not limited thereto. For example, the portable terminal may process an image previously stored in a memory. For example, when entering into an image editing mode, the portable terminal may control the camera unit or may retrieve data stored in a memory to display an image to be edited on a touch screen. Then, the portable terminal may generate a partial area in the image and store the partial area of the corresponding image. Also, the portable terminal may display an overlaid image in which the stored partial area is overlaid onto another edit image. Further configurations are similar to the above-described exemplary embodiments, and thus, detailed description thereof is omitted.

According to exemplary embodiments of the present invention, the portable terminal can selectively store an area having a desired format and size when an image is photographed. Further, the portable terminal can selectively store an area having a desired format and size from a selected image when the image is edited. In addition, when an image is photographed or edited, the portable terminal can store an overlaid image in which at least two images are overlaid. Accordingly, the portable terminal can easily perform image photographing and editing.

While the present invention has been shown with reference to certain exemplary embodiments thereof, it will be understood by those skilled in the art that various changes in form and details may be made therein without departing from the spirit and scope of the of the present invention as defined by the appended claims and their equivalents.

What is claimed is:

1. A method for processing an image in a portable terminal, the method comprising:
    displaying a preview image obtained from a camera sensor;
    detecting a touch input on a touch screen while the preview image is displayed on the touch screen;
    in response to the touch input is a capture input, capturing first image data from the camera sensor corresponding to the preview image and storing the first captured image data in a memory, wherein the stored first captured image data comprises the first captured image data corresponding to the preview image;
    in response to the touch input is a drawing input for defining a partial area of the preview image, capturing second image data from the camera sensor corresponding to the partial area of the preview image;
    displaying the second captured image data on the touch screen; and
    in response to a storage input on the touch screen while the second captured image data is displayed, storing the second captured image data in the memory,
    wherein the stored second captured image data comprises the second captured image data corresponding to the partial area of the preview image.

2. The method according to claim 1, further comprising receiving a cancel input while the second captured image data is displayed on the touch screen and again displaying the preview image on the touch screen while the preview image is currently being detected by the camera sensor.

3. The method according to claim 2, wherein the cancel input is received on the touch screen outside of the partial area.

4. The method according to claim 1, wherein the touch input comprises a drawing input on the touch screen while displaying the preview image.

5. The method according to claim 4, wherein the drawing input on the touch screen comprises a drawing input path that substantially encloses the partial area of the preview image.

6. The method according to claim 5, wherein the partial area of the preview image is confirmed in response to releasing the drawing input from the touch screen.

7. The method according to claim 4,
    wherein the drawing input on the touch screen comprises a touch path that bisects the preview image from an edge of the preview image to another edge of the preview image, and
    wherein at least one bisected preview image portion comprises the partial area.

8. The method according to claim 1, wherein the storage input is received on the touch screen within the partial area.

9. The method according to claim 1, wherein the storage input is automatically generated based on a feature of the partial area.

10. A portable terminal comprising:
    a memory;
    a camera sensor;
    a touch screen; and
    at least one processor,
    wherein the memory stores instructions which, when executed by the at least one processor, cause the portable terminal to:
        display a preview image obtained from the camera sensor,
        detect a touch input on the touch screen while the preview image is displayed on the touch screen,
        if the touch input is a capture input, capture first image data from the camera sensor corresponding to the preview image and store the first captured image data in the memory, wherein the stored first captured image data comprises the first captured image data corresponding to the preview image,
        if the touch input is a drawing input for defining a partial area of the preview image, capture second image data from the camera sensor corresponding to the partial area of the preview image,
        display the second captured image data on the touch screen, and
        in response to a storage input on the touch screen while the second captured image data is displayed, store the second captured image data in the memory, and
    wherein the stored second captured image data comprises the second captured image data corresponding to the partial area of the preview image.

11. The portable terminal according to claim 10, wherein the instructions are further configured to cause the portable terminal to control to receive a cancel input while the second captured image data is displayed on the touch screen and again display the preview image on the touch screen while the preview image is currently being detected by the camera sensor.

12. The portable terminal according to claim 11, wherein the cancel input is received on the touch screen outside of the partial area.

13. The portable terminal according to claim 10, wherein the instructions are further configured to cause the portable terminal to detect the touch input in response to a drawing input on the touch screen while displaying the preview image.

14. The portable terminal according to claim 13, wherein the drawing input on the touch screen comprises a drawing input path that substantially encloses the partial area of the preview image.

15. The portable terminal according to claim 14, wherein the partial area of the preview image is confirmed in response to releasing the drawing input from the touch screen.

16. The portable terminal according to claim 13, wherein the drawing input on the touch screen comprises a touch path that bisects the preview image from an edge of the preview image to another edge of the preview image, and wherein at least one bisected preview image portion comprises the partial area.

17. The portable terminal according to claim 10, wherein the storage input is received on the touch screen within the partial area.

18. The portable terminal according to claim 10, wherein the storage input is automatically generated based on a feature of the partial area.

19. The portable terminal according to claim 10, wherein the camera sensor includes a Digital Signal Processor.

20. A non-transitory computer-readable storage medium configured to store one or more computer programs including instructions that, when executed by at least one processor, cause the at least one processor to control to:
    display a preview image obtained from a camera sensor;
    detect a touch input on a touch screen while the preview image is displayed on the touch screen;
    in response to the touch input is a capture input, capture first image data from the camera sensor corresponding to the preview image and store the captured image data in a memory, wherein the stored captured image data comprises the captured image data corresponding to the preview image;
    in response to the touch input is a drawing input for defining a partial area of the preview image, capture second image data from the camera sensor corresponding to the partial area of the preview image,
    display the second captured image data on the touch screen; and
    in response to a storage input on the touch screen while the second captured image data is displayed, store the second captured image data corresponding to the partial area in the memory,
    wherein the stored second captured image data comprises the second captured image data corresponding to the partial area of the preview image.

21. The non-transitory computer-readable storage medium of claim 20, further comprising instructions that, when executed by at least one processor, cause the at least one processor to control to receive a cancel input while the second captured image data is displayed on the touch screen and again display the preview image on the touch screen while the preview image is currently being detected by the camera sensor.

* * * * *